UNITED STATES PATENT OFFICE.

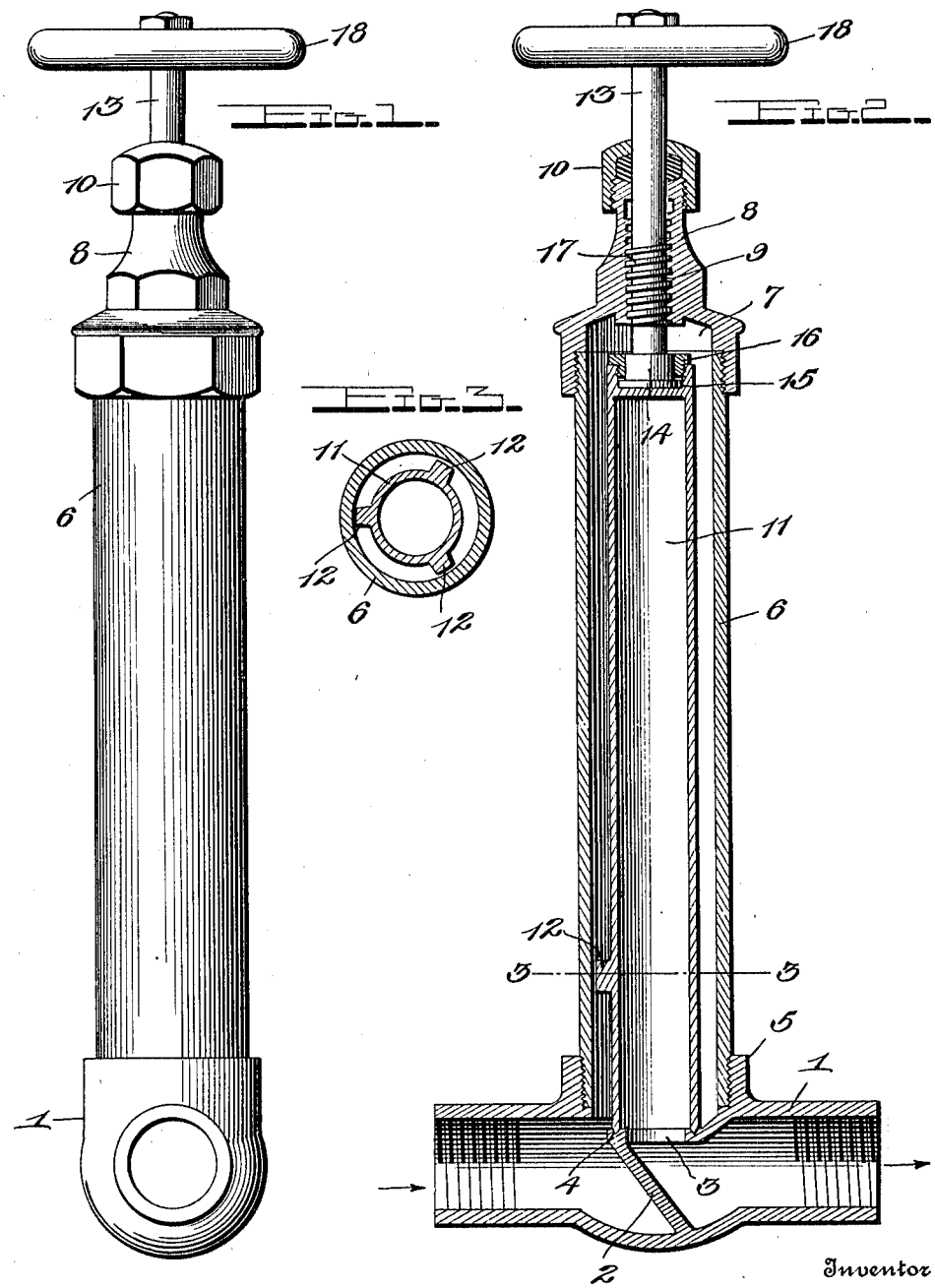

LAMBERT COSTER, OF COLLEGE POINT, NEW YORK.

STEAM-TRAP.

1,088,882.  Specification of Letters Patent.  Patented Mar. 3, 1914.

Application filed April 28, 1913. Serial No. 764,110.

*To all whom it may concern:*

Be it known that I, LAMBERT COSTER, a citizen of the United States, residing at College Point, in the county of Queens and State of New York, have invented certain new and useful Improvements in Steam-Traps; and I do declare the following to be a full, clear, and exact description of the invention, such as will enable others skilled in the art to which it appertains to make and use the same.

This invention relates to improvements in steam traps.

One object of the invention is to provide a steam trap having an improved construction and arrangement of thermostatic valve which will automatically open and permit the escape of water from the pipes in which the trap is arranged but which will not permit the discharge of steam.

Another object is to provide a steam trap which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a side view of my improved steam trap; Fig. 2 is a central vertical longitudinal section thereof showing the valve in closed position; Fig. 3 is a cross sectional view through the valve casing taken on the line 3—3 of Fig. 2.

In the embodiment of the invention, I provide a three-way coupling member 1 having therein a centrally disposed irregular partition 2 in which is formed a discharge passage 3 surrounded by an annular recessed valve seat 4. The inlet and discharge ends or branches of the coupling are preferably, though not necessarily, arranged in line as herein shown and said ends are preferably interiorly threaded to receive the ends of the pipes to which the coupling is connected. The central or right angular branch 5 of the coupling is also preferably threaded and is arranged concentric to the valve seat 4 and discharge opening 3 in the partition 2.

To the branch 5 of the coupling is secured the inner end of a tubular cylindrical valve casing 6 formed of cast iron or other suitable metal which does not readily expand and contract under heat and cold. The outer end of the valve casing 6 has secured thereto a cap 7 having a tubular neck 8 the bore of which is coarsely threaded as shown at 9. On the outer end of the neck 8 is a packing gland 10.

Concentrically arranged in the casing 6 is a tubular valve 11 the diameter of which is considerably less than the inside diameter of the casing 6 and corresponds to the diameter of the valve seat 4 in the partition 2 of the coupling member 1. The edge of the inner end of the valve 11 is tapered to conform to the shape of the recessed seat 4 with which said edge is engaged when the valve is in its normal or closed position. The inner end of the valve is held in the center of the casing 6 by radially disposed centering lugs 12 which are formed on the valve as clearly shown in Fig. 3 of the drawing.

The valve 11 is provided with a stem 13 having on its inner end a flanged head 14 which is loosely engaged with a recess 15 in the outer end of the valve, said headed end of the stem being swiveled in the recess 15 by a threaded ring 16 which is screwed into the end of the valve around the head 14 as shown. The stem 13 is provided with coarse screw threads 17 which engage the threads 9 in the bore of the neck 8 whereby when the stem is revolved in one direction or the other the valve 11 is retracted or projected in the tube 6 as will be readily understood. On the outer end of the stem 13 is arranged a hand wheel 18 or other suitable means for operating the stem.

The valve 11 is formed of metal having high expanding and contracting qualities and in the operation of the trap, steam is admitted to the casing 6 and on coming into contact with the valve 11 the heat from the stem expands the valve automatically. When the valve is thus expanded the stem 13 is operated to close the valve into engagement with the seat 4, thus closing the passage 3 through the coupling member 1. As long as steam remains in the casing 6 the valve will remain expanded and in a closed position. As soon, however, as the steam leaves the casing and water accumulates therein, the difference between the temperature of the water and the steam will contract the valve 11, thus causing the latter to automatically disengage its seat and open the passage 3 and permit the water to escape from the casing and pipes to which the same is connected. When the water is entirely drained from the pipes and steam again accumulates and enters the valve casing, the heat of the steam will again expand the valve and cause the same to engage its seat, thereby cutting off the escape of the steam. It will thus be seen that my improved steam trap is strictly automatic in its operation and will effectually prevent any escape of steam, at the same time will allow any water which accumulates in the pipes to which the trap is connected, from condensation or other cause to escape or drain from the pipes.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

In a steam trap, a coupling having inlet and discharge openings and an apertured partition therein between said openings, a valve seat formed in said partition around the aperture therein, a valve casing connected with said coupling around said valve seat and spaced therefrom, a closure for the outer end of said casing, a thermostatic valve arranged in said casing and of smaller diameter than the casing and with one end adapted to engage said seat when expanded and to leave the seat when contracted, said valve seat being located within the coupling below the top of the inlet and outlet passages, whereby the water of condensation may be discharged through the coupling by gravity alone when the valve is opened and the thermostatic valve quickly unsealed to the influence of the steam, and means for adjusting the valve toward or away from its seat.

In testimony whereof I have hereunto set my hand in presence of two subscribing witnesses.

LAMBERT COSTER.

Witnesses:
CARL A. NIEMEYER,
WILLIAM A. GAUCH.